(12) United States Patent
Hwang et al.

(10) Patent No.: US 7,795,793 B2
(45) Date of Patent: Sep. 14, 2010

(54) SURFACE LIGHT SOURCE AND DISPLAY DEVICE HAVING THE SAME

(75) Inventors: In-Sun Hwang, Suwon-si (KR); Hae-Il Park, Seoul (KR); Sang-Yu Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 825 days.

(21) Appl. No.: 11/215,773

(22) Filed: Aug. 30, 2005

(65) Prior Publication Data
US 2006/0125375 A1 Jun. 15, 2006

(30) Foreign Application Priority Data
Dec. 13, 2004 (KR) ...................... 10-2004-0104984

(51) Int. Cl.
*H01J 1/62* (2006.01)
*H01J 9/02* (2006.01)
(52) U.S. Cl. ..................... 313/495; 313/310; 313/497
(58) Field of Classification Search ......... 313/495–497, 313/309–311
See application file for complete search history.

(56) References Cited

U.S. PATENT DOCUMENTS

| | | | |
|---|---|---|---|
| 2002/0017864 A1* | 2/2002 | Watanabe et al. | 313/586 |
| 2003/0146689 A1* | 8/2003 | Hwu et al. | 313/495 |
| 2003/0230969 A1* | 12/2003 | Mizuno et al. | 313/495 |
| 2004/0072494 A1* | 4/2004 | Nakamoto | 445/24 |
| 2005/0206298 A1* | 9/2005 | Lee et al. | 313/495 |

* cited by examiner

*Primary Examiner*—Bumsuk Won
(74) *Attorney, Agent, or Firm*—F. Chau & Associates, LLC

(57) ABSTRACT

A surface light source includes a body, an electrode, a transparent electrode, an electron-emitting member, a conductive grid member, a fluorescent layer and a supporting part. The body includes first and second body parts spaced apart from each other. The electrode and the transparent electrode are disposed on the first and second body parts, respectively. The electron-emitting member is disposed on the electrode to emit an electron toward the transparent electrode. The conductive grid member is disposed between the electrode and the transparent electrode to accelerate the electron. The fluorescent layer is disposed on the transparent electrode to convert the electron into visible light. The supporting part is integrally formed with the body to support the first and second body parts.

8 Claims, 14 Drawing Sheets

SURFACE LIGHT SOURCE AND DISPLAY DEVICE HAVING THE SAME

CROSS REFERENCE TO RELATED APPLICATION

This application claims priority to Korean Patent Application No. 2004-104984 filed on Dec. 13, 2004, the contents of which are herein incorporated by reference in their entirety.

BACKGROUND OF THE INVENTION

1. Technical Field

The present disclosure relates to a surface light source and a display device having the surface light source, and more particularly, to a surface light source capable of simplifying a manufacturing process and improving optical characteristics, and a display device having the surface light source.

2. Discussion of the Related Art

Generally, a flat display device such as a liquid crystal display (LCD) device converts electrical data received from an information-processing unit into an image.

Liquid crystal of the LCD device has an electrical characteristic in that liquid crystal molecules are rearranged by electric fields applied to the liquid crystal molecules, and an optical characteristic in that optical transmissivity is changed according to arrangements of the liquid crystal molecules.

The LCD device includes an LCD panel and a backlight assembly. The LCD panel controls an arrangement of liquid crystal molecules. The backlight assembly provides the LCD panel with light. The backlight assembly includes a light source for generating light. Examples of the light source include a point light source such as a light emitting diode, a line light source such as a cold cathode fluorescent lamp (CCFL) and a surface light source.

A conventional surface light source provides light having a uniform luminance into an LCD panel. The conventional surface light source includes a discharge gas such as mercury. The surface light source converts invisible light such as ultraviolet light generated by the discharge gas into visible light.

The conventional surface light source discharges a noxious gas such as mercury, thereby causing mercury pollution. In addition, when mercury is used, optical characteristics of the surface light source are varied in accordance with a surrounding temperature.

SUMMARY OF THE INVENTION

Embodiments of the present invention provide a mercury-free surface light source and a display device comprising the surface light source.

According to an embodiment of the present invention, a surface light source includes a body, an electrode, a transparent electrode, an electron-emitting member, a conductive grid member, a fluorescent layer and a supporting part. The body includes a first body part and a second body part spaced apart from the first body part. The electrode is disposed on the first body part. The transparent electrode is disposed on the second body part. The electron-emitting member is disposed on the electrode to emit an electron toward the transparent electrode. The conductive grid member is disposed between the electrode and the transparent electrode to accelerate the electron emitted from the electron-emitting member. The fluorescent layer is disposed on the transparent electrode to convert the electron into visible light. The supporting part is integrally formed with the body to support the first body part and the second body part.

According to an embodiment of the present invention, a surface light source includes a body, an electron-emitting member, a conductive grid member, a fluorescent layer and a supporting part. The body includes a first substrate on which an electrode is formed, a second substrate on which a transparent electrode is formed and a sealing member interposed between the first and second substrates to seal the first and second substrates. The transparent electrode of the second substrate faces the electrode of the first substrate. The electron-emitting member is disposed on the electrode to emit an electron toward the transparent electrode. The fluorescent layer is disposed on the transparent electrode to convert the electrons into visible light. The supporting part is integrally formed with the body to support the first substrate and the second substrate.

According to an embodiment of the present invention, a surface light source includes a first substrate, a second substrate, an electrode, a transparent electrode, an electron-emitting member, a conductive grid member and a fluorescent layer. The second substrate is disposed over the first substrate. The second substrate includes a light-emitting part having at least one ridge and grooves adjacent to the ridge. The electrode is disposed over the first substrate and corresponds to the light-emitting part. The electrode has substantially the same curvature as that of an inner surface of the light-emitting part. The transparent electrode is formed on an inner surface of the second substrate corresponding to the first electrode. The electron-emitting member is disposed on the first electrode to emit the electron. The conductive grid member has a substantially same curvature as that of the electron-emitting member to accelerate the electron emitted from the electron-emitting member. The fluorescent layer is disposed on an upper surface of the transparent electrode to convert the electron into visible light.

According to an embodiment of the present invention, a display device includes a receiving container, a surface light source and a display panel. The surface light source is received in the receiving container. The surface light source includes a body having first and second faces corresponding to each other, an electrode disposed on the first face, a transparent electrode disposed on the second face, an electron-emitting member disposed on the electrode to emit the electron toward the transparent electrode, a fluorescent layer disposed on the transparent electrode to convert the electron into visible light and a supporting part integrally formed with the body to support the first and second faces. The display panel is received in the receiving container to display an image using the visible light.

BRIEF DESCRIPTION OF THE DRAWINGS

Preferred embodiments of the present disclosure can be understood in more detail from the following descriptions taken in conjunction with the accompanying drawings, in which.

DETAILED DESCRIPTION OF THE EMBODIMENTS

Preferred embodiments of the present invention will be described below in more detail with reference to the accompanying drawings. The present invention may, however, be embodied in many different forms and should not be construed as limited to the embodiments set forth herein.

Figure 1:
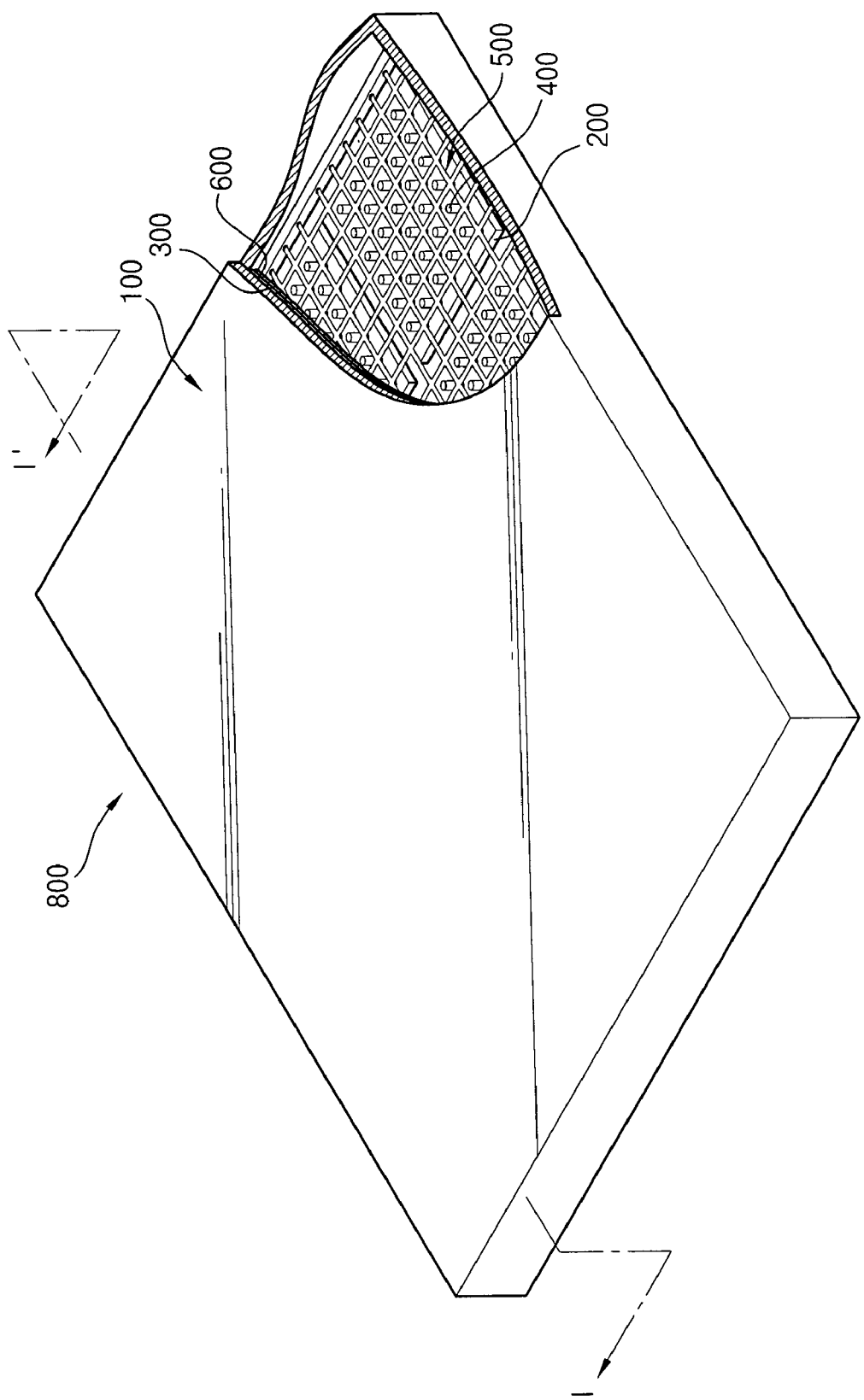
FIG. 1 is a partially cut perspective view illustrating a surface light source according to an embodiment of the present invention.
Figure 2:
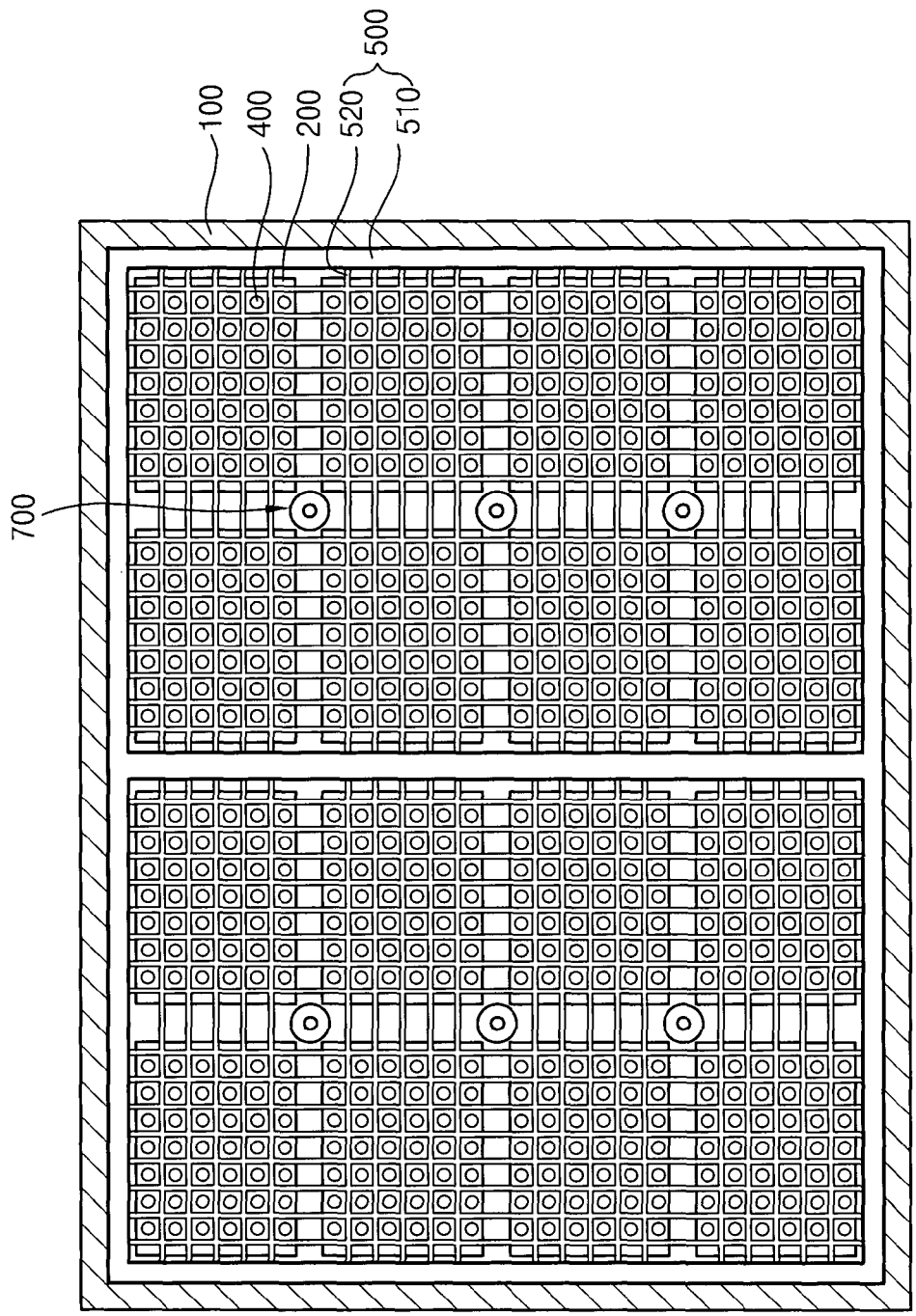
FIG. 2 is a plan view illustrating an inside of the surface light source in FIG. 1.
Figure 3:
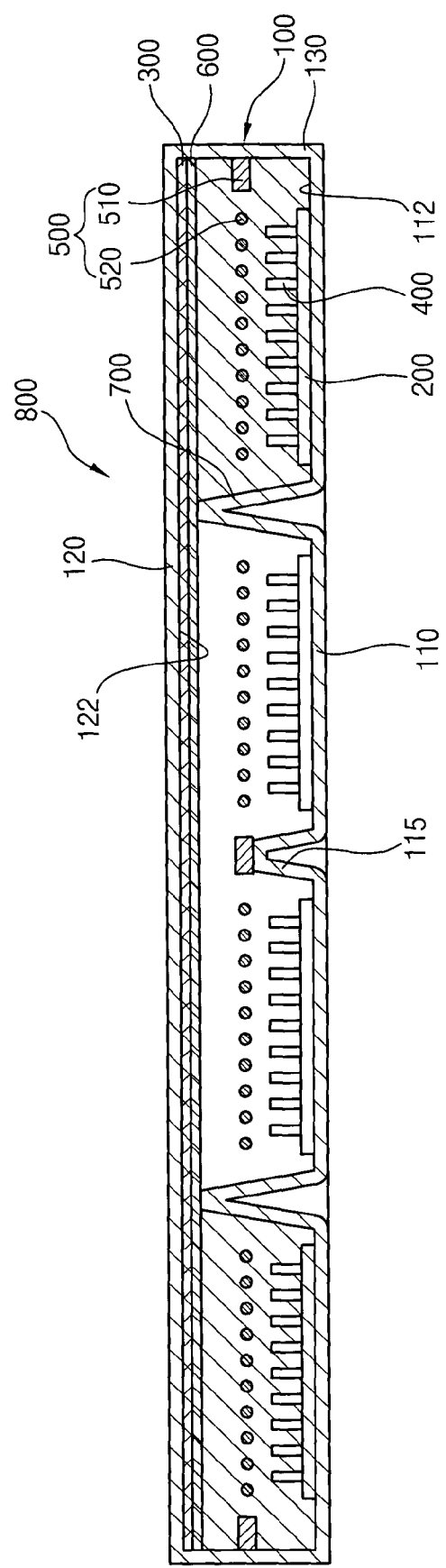
FIG. 3 is a cross-sectional view taken along the line I-I' in FIG. 1.

FIG. 1 is a partially cut perspective view illustrating a surface light source according to an exemplary embodiment of the present invention. FIG. 2 is a plan view illustrating an inside of the surface light source in FIG. 1. FIG. 3 is a cross-sectional view taken along the line I-I' in FIG. 1.

Referring to FIGS. 1 to 3, a surface light source 800 includes a body 100, an electrode 200, a transparent electrode 300, an electron-emitting member 400, a conductive grid member 500, a fluorescent layer 600 and a supporting part 700.

Referring to FIG. 3, the body 100 has an inner space. The body 100, for example, has a rectangular parallelepiped shape. The body 100 includes a transparent material, for example, such as glass. The body 100 includes a first body part 110, a second body part 120 and third body parts 130.

The first body part 110 and the second body part 120, for example, have a plate shape. Alternatively, the first and second body parts 110 and 120, for example, have a rectangular parallelepiped plate shape. In an embodiment of the present invention, the first and second body parts 110 and 120 have substantially the same shape and substantially the same area. The third body parts 130 are integrally connected to the first body part 110 and the second body part 120 to define the inner space in the body 100. The third body parts 130, the first body part 110 and the second body part 120 may be formed as a complete unit.

In an embodiment of the present invention, the first body part 110, the second body part 120 and the third body parts 130 are integrally formed with each other. Alternatively, the first body part 110 and the third body parts 130 may be integrally formed with each other, and the second body part 120 may be connected to the third body parts 130. Alternatively, the second body part 120 and the third body parts 130 may be integrally formed with each other, and the first body part 110 may be connected to the third body parts 130.

The electrode 200 is disposed on a first face 112 of the first body part 110. The electrode 200, for example, includes a metal. Examples of the metal may include aluminum (Al), silver (Ag), and copper (Cu). The electrode 200, for example, has a plate shape. The electrode 200 may have a rectangular shape as shown in the plan view. The electrode 200 may be attached to the first face 112 by an adhesive member.

In an embodiment of the present invention, the surface light source 800 includes a plurality of electrodes 200 arranged on the first face 112 in a matrix shape. Alternatively, the surface light source 800 may include one electrode 200 on the first face 112. When a single electrode 200 is formed on the first face 112, an area of the first face 112 and an area of the electrode 200 are substantially the same. A negative direct current reference voltage may be applied to the electrode 200.

The transparent electrode 300 is formed on a second face 122 of the second body part 120. The transparent electrode 300, for example, includes a material such as indium tin oxide (ITO), indium zinc oxide (IZO), and amorphous indium tin oxide (a-ITO).

A positive direct current voltage may be applied to the transparent electrode 300. The direct current voltage applied to the transparent electrode 300 is in a range of about 5 kV to about 10 kV. A velocity and a direction of an electron emitted from the electron-emitting member 400 may be controlled by the direct current voltage applied to the transparent electrode 300.

In an embodiment of the present invention, the surface light source 800 includes a plurality of electron-emitting members 400 arranged on each electrode 200 in a matrix shape. Each of the electron-emitting members 400, for example, has a cylindrical shape, and is disposed substantially in parallel with the electrode 200. The electron-emitting members 400, for example, include carbon nanotubes (CNT).

The conductive grid member 500 emits electrons from the electron-emitting members 400 toward the transparent electrode 300. The conductive grid member 500 is disposed between the first body part 110 and the second body part 120.

The conductive grid member 500 includes a frame 510 and conductive wires 520. The frame 510 is formed along the third body part 130 of the body 100. Thus, the frame 510 may have a rectangular frame shape as shown in the plan view. The conductive wires 520 are attached to the frame 510 in a lattice shape. When the conductive grid member 500 includes the conductive wires 520, an area of the electrode 200 increases, and a number of the electron-emitting members 400 disposed on the electrodes 200 increases, thereby enhancing a luminance of light generated from the surface light source. At least one electron-emitting member 400 may be disposed between adjacent conductive wires 520 as shown in the plan view. The conductive wires 520 may be disposed adjacent to the electron-emitting members 400.

A positive direct current voltage that is in a range of about 10 kV to about 50 kV may be applied to the conductive grid member 500 to emit electrons from the electron-emitting members 400.

A fixing protrusion 115 may be protruded from the first body part 110 to prevent the conductive grid member 500 from being deformed. The first body part 110 may include a plurality of fixing protrusions 115 formed on the first body part 110 to prevent the conductive grid member 500 from being deformed. Alternatively, the fixing protrusion 115 may be formed on the second body part 120.

The fluorescent layer 600 is disposed on the transparent electrode 300 formed on the second body part 120 of the body 100. The fluorescent layer 600 generates visible light using the electrons emitted from the electron-emitting members 400. The fluorescent layer 600, for example, includes a red fluorescent material for generating red visible light, a green fluorescent material for generating green visible light and a blue fluorescent material for generating blue visible light.

The body 100 may have an internal pressure less than an atmospheric pressure to generate electrons in the body 100. The generated electrons collide with the fluorescent layer 600 to generate visible light. For example, the body 100 has an internal pressure of about $10^{-7}$ Pa to about $10^{-6}$ Pa, which corresponds to a high vacuum pressure. When the high vacuum pressure is generated in the body 100, the body may be damaged by a pressure difference between the inside and the outside of the body 100.

In an embodiment of the present invention, the surface light source 800 includes the supporting part 700 formed in the body 100 to prevent the body 100 from being damaged by the pressure difference, to simplify a manufacturing process, and to enhance optical luminance. The body 100 and the supporting part 700, for example, have substantially the same material.

Referring again to FIG. 3, the supporting part 700 is formed on the first body part 110. When an area on which the supporting part 700 and the second body part 120 contact each other increases, the luminance of the light generated from the surface light source may be lowered by the supporting part 700. Thus, the supporting part 700 may have, for example, a cone shape, a triangular pyramid shape, a polygonal pyramid shape, a cylindrical shape, a triangular cylindrical shape, a quadrangular cylindrical shape, and a polygonal cylindrical shape which are protruded from the first body part 110 toward the second body part 120. In an embodiment of the present invention, the supporting part 700 has a cone shape.

When an area on which the supporting part 700 having a cone shape and the second body part 120 contact each other is substantially small, an excessive pressure applied to the supporting part 700 may cause damage to the supporting part 700 and/or the second body part 120. Thus, an end portion of the supporting part 700 may be rounded.

Figure 4:
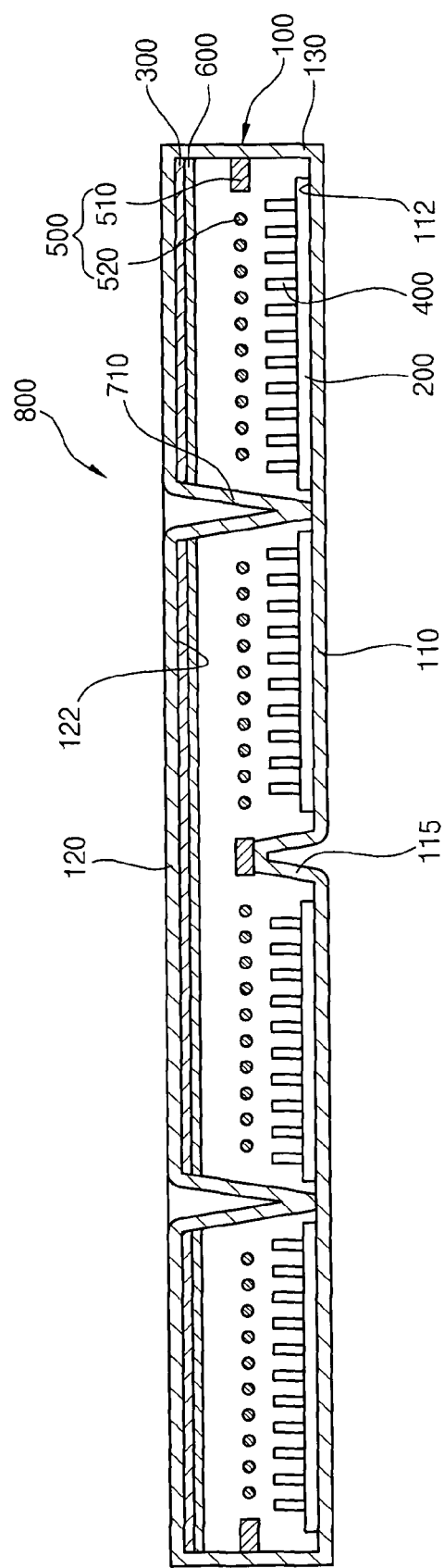
FIG. 4 is a cross-sectional view illustrating a surface light source according to an embodiment of the present invention.

FIG. 4 is a cross-sectional view illustrating a surface light source according to an embodiment of the present invention. The surface light source of FIG. 4 is substantially identical to the surface light source of FIG. 3 except for the supporting parts.

Referring to FIG. 4, a supporting part 710 is formed on the second body part 120. The supporting part 710, for example, has a cone shape, a triangular pyramid shape, or a polygonal pyramid shape. In an embodiment of the present invention, the supporting part 710 has a cone shape. When the supporting part 710 having a cone shape is formed on the second body part 120, total areas of the electrodes 200 disposed on the first body part 110 increase. Thus, additional electron-emitting members 400 may be disposed on the electrodes 200. As a result, the luminance of the light generated from the surface light source 800 may be enhanced.

When an area on which the supporting part 710 having a cone shape and the first body part 110 contact with each other is substantially small, an excessive pressure applied to the supporting part 710 may cause damage to the supporting part 710 and/or the first body part 110. Thus, an end portion of the supporting part 710 may be rounded.

Figure 5:
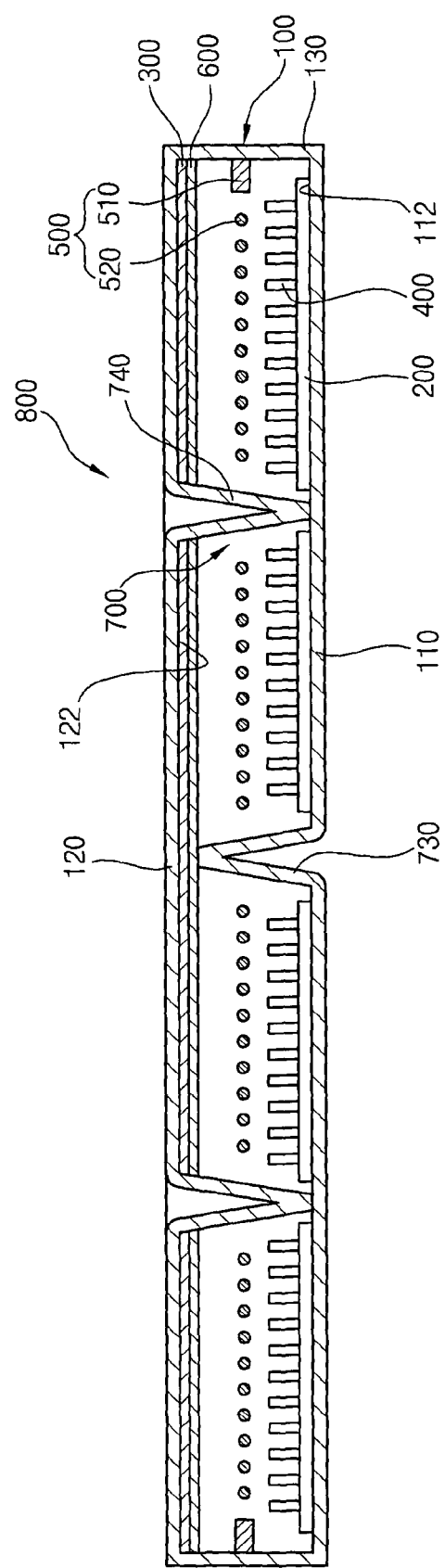
FIG. 5 is a cross-sectional view illustrating a surface light source according to an embodiment of the present invention.

FIG. 5 is a cross-sectional view illustrating a surface light source according to an embodiment of the present invention. The surface light source of FIG. 5 is substantially identical to the surface light source of FIG. 3 except for the supporting parts.

Referring to FIG. 5, a supporting part 700 includes a first supporting part 730 and a second supporting part 740. The first supporting part 730 is formed on the first body part 110, and protruded from the first body part 110 to contact the second body part 120. When an area on which the first supporting part 730 and the second body part 120 contact each other increases, the luminance of the light generated from the surface light source may be lowered by the first supporting part 730. Thus, the first supporting part 730 may have, for example, a cone shape, a triangular pyramid shape, a polygonal pyramid shape, a cylindrical shape, a triangular cylindrical shape, a quadrangular cylindrical shape, or a polygonal cylindrical shape, which are protruded from the first body part 110 toward the second body part 120. In an embodiment of the present invention, the supporting part 730 has a cone shape.

When an area on which the first supporting part 730 having a cone shape and the second body part 120 contact each other is substantially small, an excessive pressure applied to the first supporting part 730 may cause damage to the first supporting part 730 and/or the second body part 120. Thus, an end portion of the first supporting part 730 may be rounded.

The second supporting part 740 is formed on the second body part 120. The second supporting part 740, for example, has a cone shape, a triangular pyramid shape, or a polygonal pyramid shape. In an embodiment of the present invention, the second supporting part 740 has a cone shape. When second supporting part 740 having a cone shape is formed on the second body part 120, total areas of the electrodes 200 disposed on the first body part 110 increase. Thus, additional electron-emitting members 400 may be disposed on the electrodes 200. As a result, the luminance of the light generated from the surface light source 800 may be enhanced.

When an area on which the second supporting part 740 having a cone shape and the first body part 110 contact each other is substantially small, an excessive pressure applied to the second supporting part 740 may cause damage to the second supporting part 740 and/or the first body part 110. Thus, an end portion of the second supporting part 740 may be rounded.

Figure 6:
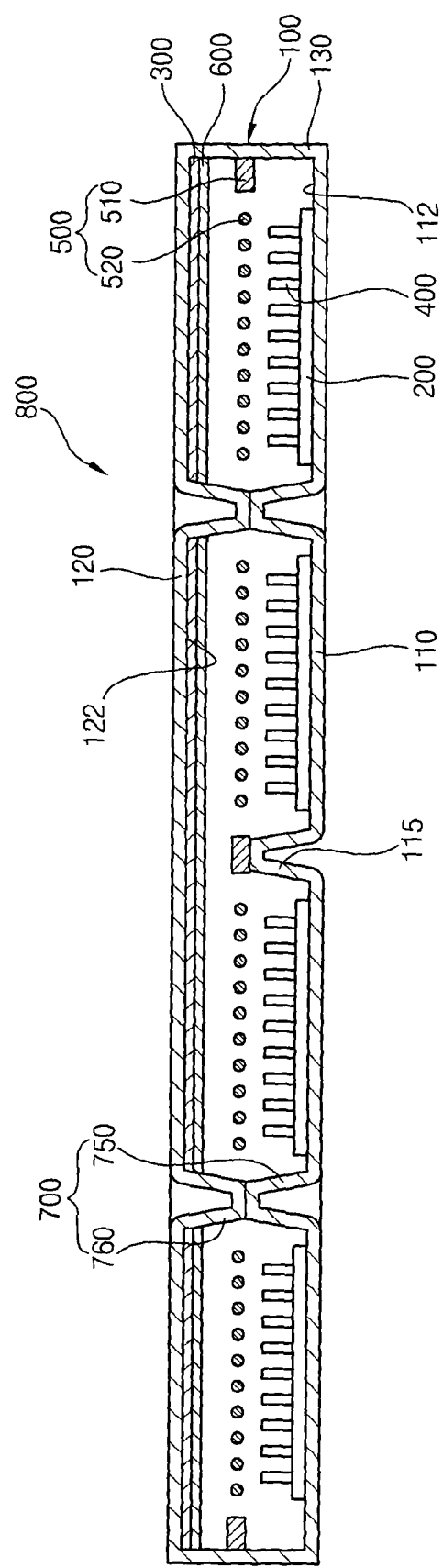
FIG. 6 is a cross-sectional view illustrating a surface light source according to an embodiment of the present invention.

FIG. 6 is a cross-sectional view illustrating a surface light source according to an embodiment of the present invention. The surface light source of FIG. 6 is substantially identical to the surface light source of FIG. 1 except for the supporting parts.

Referring to FIG. 6, a supporting part 700 includes a first supporting part 750 and a second supporting part 760. The first supporting part 750 is protruded from the first body part 110 toward the second body part 120. The first supporting part 750 protruded from the first body part 110 has an end portion substantially parallel with the first body part 110. The first supporting part 750, for example, has a truncated cone shape, a truncated triangular pyramid, or a truncated polygonal pyramid. In an embodiment of the present invention, the first supporting part 750 has a truncated cone shape.

The second supporting part 760 is protruded from the second body part 120 toward the first body part 110. The second supporting part 760 protruded from the second body part 120 has an end portion contacting an end portion of the first supporting part 750. The second supporting part 760, for example, has a truncated cone shape, a truncated triangular pyramid, or a truncated polygonal pyramid. In an embodiment of the present invention, the second supporting part 760 has a truncated cone shape.

Figure 7:
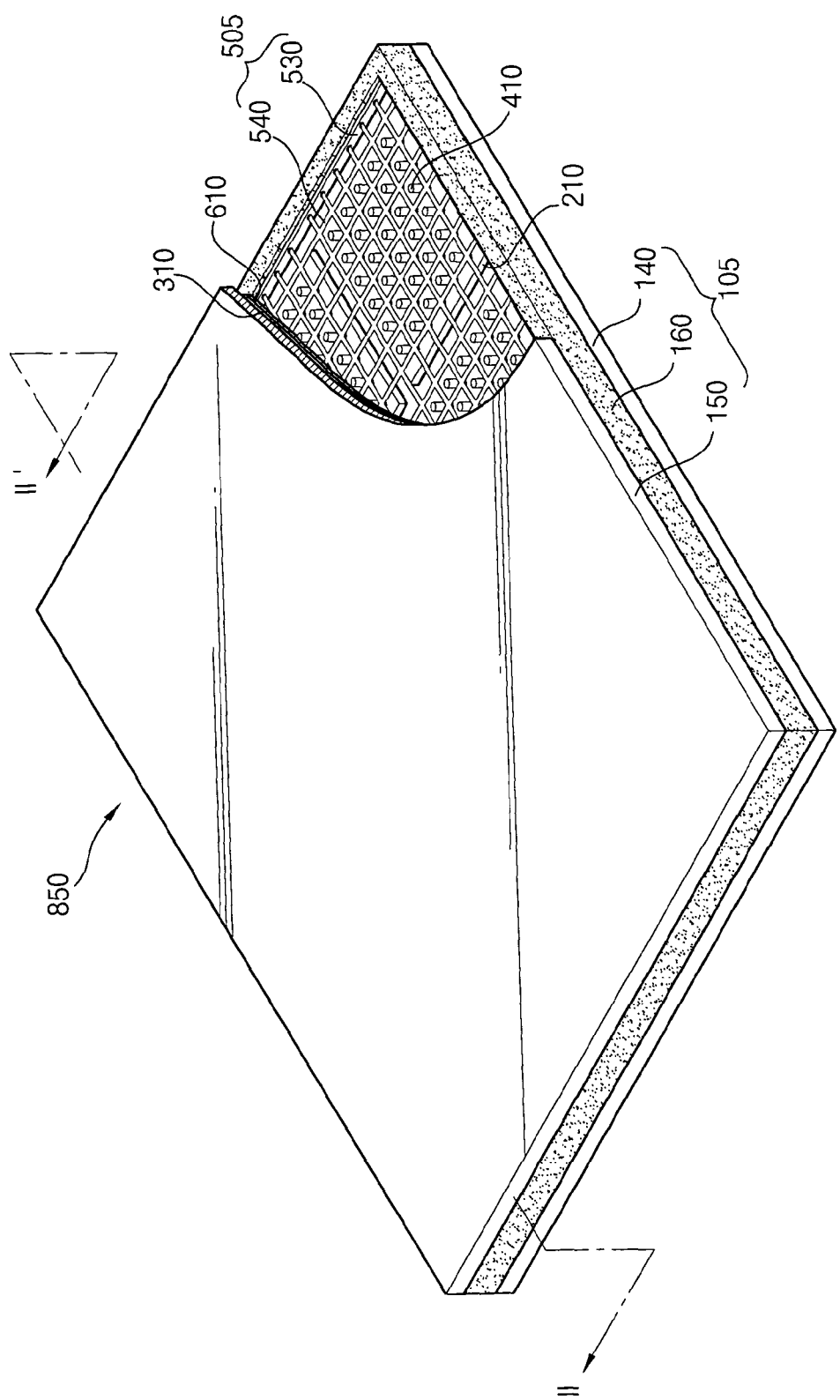
FIG. 7 is a partially cut perspective view illustrating a surface light source according to an embodiment of the present invention.
Figure 8:
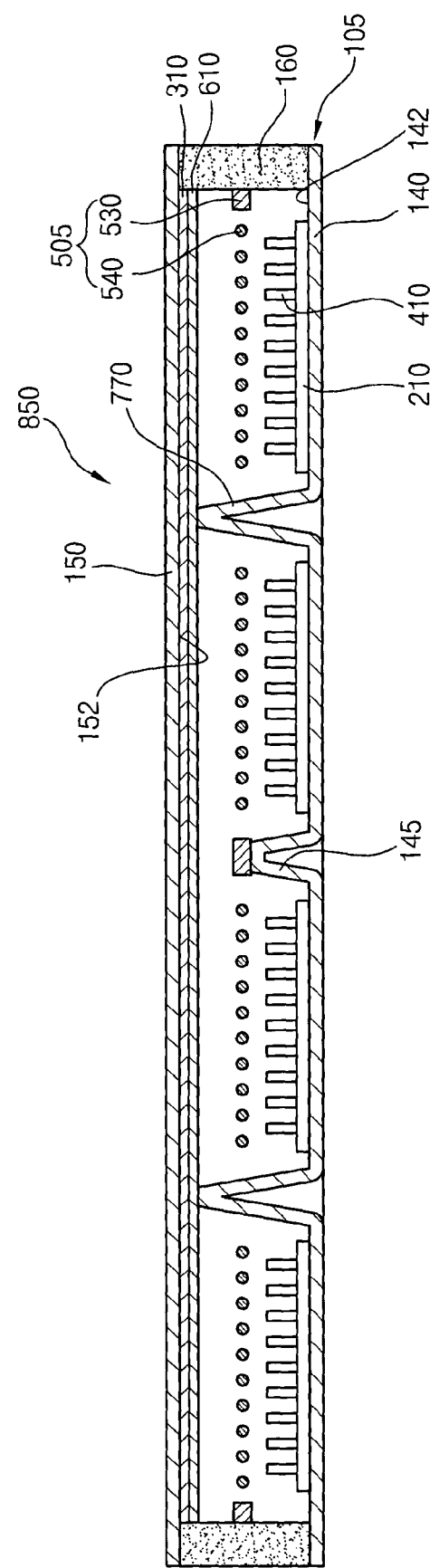
FIG. 8 is a cross-sectional view taken along the line II-II' in FIG. 7.

FIG. 7 is a partially cut perspective view illustrating a surface light source according to an embodiment of the present invention. FIG. 8 is a cross-sectional view taken along the line II-II' in FIG. 7.

Referring to FIGS. 7 and 8, a surface light source 850 includes a body 105, an electrode 210, a transparent electrode 310, an electron-emitting member 410, a conductive grid member 505, a fluorescent layer 610 and a supporting part 770.

Referring to FIG. 7, the body 105 includes a first substrate 140, a second substrate 150 and a sealing member 160. The first substrate 140, for example, has a plate shape, and has a rectangular shape viewed from a plan view. The second substrate 150, for example, has a plate shape, and has a rectangular shape which can be seen in a plan view. The first substrate 140 and the second substrate 150 have substantially the same area and shape. The sealing member 160 is interposed between the first substrate 140 and the second substrate 150. The sealing member 160 combines the first and second substrates 140 and 150 with each other to define a space between the first and second substrates 140 and 150. The sealing member 160 may be disposed along an edge portion of the first substrate 140 and an edge portion of the second substrate 150. Examples of the sealing member 160 may include, for example, a glass containing lead oxide (PbO) or ceramics.

The electrode 210 is disposed on a first face 142 of the first substrate 140 corresponding to the second substrate 150. The electrode 210, for example, includes a metal. Examples of the metal may include aluminum (Al), silver (Ag), or copper (Cu). The electrode 210, for example, has a plate shape. The electrode 210 may have a rectangular shape which can be seen in a plan view. The electrode 210 may be attached to the first face 142 by an adhesive member.

In an embodiment of the present invention, the surface light source 850 includes a plurality of electrodes 210 arranged on the first face 142 in a matrix shape. Alternatively, the surface light source 850 may include a single electrode 210 on the first face 142. When a single electrode 210 is formed on the first face 142, an area of the first face 142 and an area of the electrode 210 are substantially the same. A negative direct current reference voltage may be applied to the electrode 210.

The transparent electrode 310 is formed on a second face 152 of the second substrate 150 corresponding to the first substrate 140. The transparent electrode 310, for example, includes a material such as ITO, IZO, or a-ITO.

A positive direct current voltage may be applied to the transparent electrode 310. The direct current voltage applied to the transparent electrode 310 is in a range of about 5 kV to about 10 kV. A velocity and a direction of an electron emitted from the electron-emitting member 410 may be controlled by the direct current voltage applied to the transparent electrode 310.

In an embodiment of the present invention, the surface light source 850 includes a plurality of electron-emitting members 410 arranged on each electrode 210 in a matrix shape. Each of the electron-emitting members 410, for example, has a cylindrical shape, and is disposed substantially in parallel with the electrode 210. The electron-emitting members 410, for example, include carbon nanotubes (CNT).

The conductive grid member 505 emits electrons from the electron-emitting members 410 toward the transparent electrode 310. The conductive grid member 505 is disposed between the first substrate 140 and the second substrate 150. The conductive grid member 505 may be fixed to an inner surface of the sealing member 160.

The conductive grid member 505 includes a frame 530 and conductive wires 540. The frame 530 is formed along the sealing member 160 of the body 105. Thus, the frame 530 may have a rectangular frame shape, which can be seen in a plan view. The conductive wires 540 are attached to the frame 530 in a lattice shape.

When the conductive grid member 505 includes the conductive wires 540, a number of the electron-emitting members 410 disposed on the electrodes 210 increases, thereby enhancing a luminance of light generated from the surface light source.

At least one electron-emitting member 410 may be disposed between adjacent conductive wires 540, which can be seen in a plan view. The conductive wires 540 may be disposed adjacent to the electron-emitting members 410.

A positive direct current voltage that is in a range of about 10 kV to about 50 kV may be applied to the conductive grid member 505 to emit electrons from the electron-emitting members 410.

A fixing protrusion 145 may be protruded from the first substrate 140 to prevent the conductive grid member 505 from being deformed. The first substrate 140 may include a plurality of fixing protrusions 145 formed on the first substrate 140 to prevent the conductive grid member 505 from being deformed. Alternatively, the fixing protrusion 145 may be formed on the second substrate 150.

The fluorescent layer 610 is disposed on the transparent electrode 310 formed on the second substrate 150 of the body 105. The fluorescent layer 610 generates visible light using the electrons emitted from the electron-emitting members 410. The fluorescent layer 610, for example, includes a red fluorescent material for generating red visible light, a green fluorescent material for generating green visible light and a blue fluorescent material for generating blue visible light.

A metal thin film may be formed on the fluorescent layer 610. The metal thin film has a predetermined thickness for passing light through the metal thin film. The metal thin film, for example, eliminates the electrons formed in the fluorescent layer 610 and/or in the transparent electrode 310 to increase collisions of the fluorescent layer 610 and the emitted electrons, thereby improving a luminance of the surface light source 805.

The body 105 may have an internal pressure less than an atmospheric pressure to generate electrons in the body 105. The generated electrons collide with the fluorescent layer 610 to generate visible light. For example, the body 105 has an internal pressure of about $10^{-7}$ Pa to about $10^{-6}$ Pa, which corresponds to a high vacuum pressure.

When the high vacuum pressure is generated in the body 105, the body 105 may be damaged by a pressure difference between the inside and the outside of the body 105.

In an embodiment of the present invention, the surface light source 850 includes the supporting part 770 formed in the body 105 to prevent the body 105 from being damaged by the pressure difference, to simplify a manufacturing process, and to enhance optical luminance. The body 105 and the supporting part 770, for example, have substantially the same material.

Referring again to FIG. 8, the supporting part 770 is protruded from the first substrate 140 to contact the second substrate 150. When an area on which the supporting part 770 and the second substrate 150 contact each other increases, the luminance of the light generated from the surface light source may be lowered by the supporting part 770. Thus, the supporting part 770 may have a cone shape, a triangular pyramid shape, a polygonal pyramid shape, a cylindrical shape, a triangular cylindrical shape, a quadrangular cylindrical shape, or a polygonal cylindrical shape, which are protruded from the first substrate 140 toward the second substrate 150. In an embodiment of the present invention, the supporting part 770 has a cone shape.

When an area on which the supporting part 770 having a cone shape and the second substrate 150 contact each other is substantially small, an excessive pressure applied to the supporting part 770 may cause damage to the supporting part 770 and/or the second substrate 150. Thus, an end portion of the supporting part 770 may be rounded.

Figure 9:
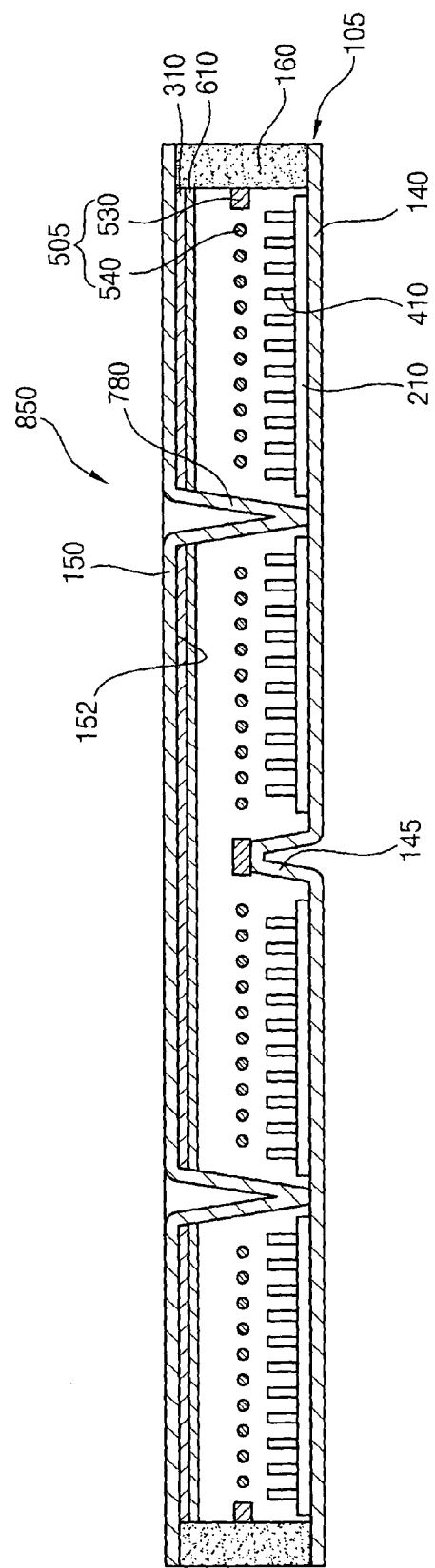
FIG. 9 is a cross-sectional view illustrating a surface light source according to an embodiment of the present invention.

FIG. 9 is a cross-sectional view illustrating a surface light source according to an embodiment of the present invention. The surface light source of FIG. 9 is substantially identical to the surface light source of FIG. 8 except for supporting parts.

Referring to FIG. 9, a supporting part 780 is formed on the second substrate 150. The supporting part 780, for example, has a cone shape, a triangular pyramid shape, or a polygonal pyramid shape. In an embodiment of the present invention, the supporting part 780 has a cone shape. When the supporting part 780 having a cone shape is formed on the second substrate 150, total areas of the electrodes 210 disposed on the first substrate 140 increase.

Thus, additional electron-emitting members 410 may be disposed on the electrodes 210. As a result, the luminance of the light generated from the surface light source 850 may be enhanced.

When an area on which the supporting part 780 having a cone shape and the first substrate 140 contact each other is substantially small, an excessive pressure applied to the supporting part 780 may cause damage to the supporting part 780 and/or the first substrate 140. Thus, an end portion of the supporting part 780 may be rounded.

Figure 10:
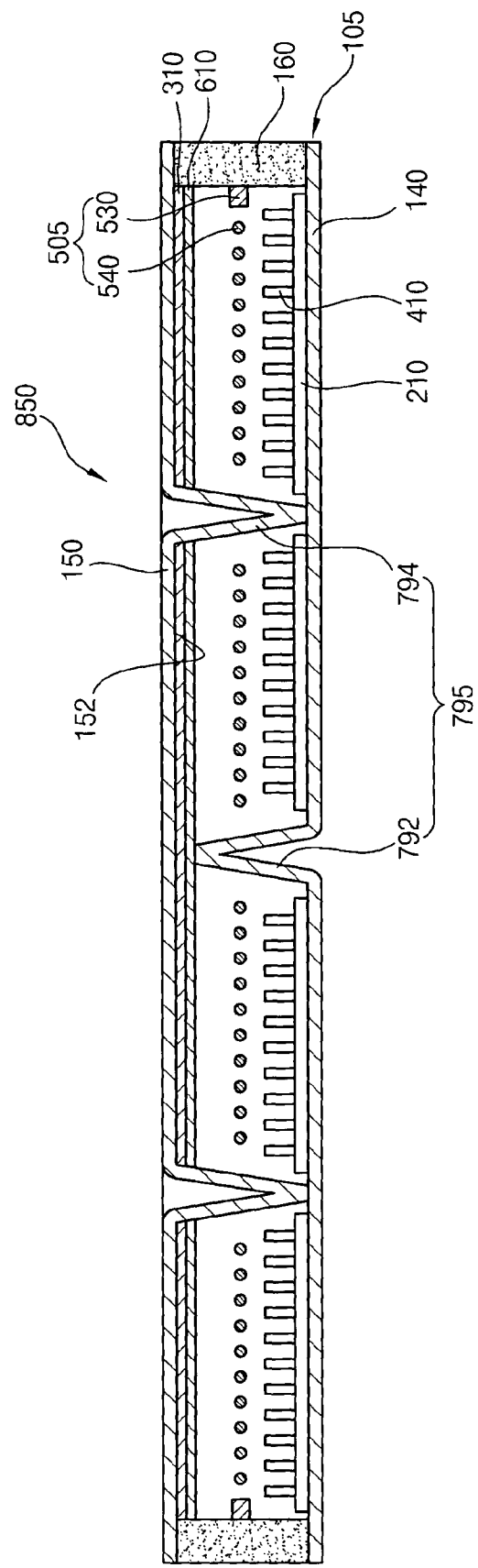
FIG. 10 is a cross-sectional view illustrating a surface light source according to an embodiment of the present invention.

FIG. 10 is a cross-sectional view illustrating a surface light source according to an embodiment of the present invention. The surface light source of FIG. 10 is substantially identical to the surface light source of FIG. 8 except for supporting parts.

Referring to FIG. 10, a supporting part 795 includes a first supporting part 792 and a second supporting part 794. The first supporting part 792 is formed on the first substrate 140, and protruded from the first substrate 140 to contact the second substrate 150. When an area on which the first supporting part 792 and the second substrate 150 contact each other increases, the luminance of the light generated from the surface light source may be lowered by the first supporting part 792. Thus, the first supporting part 792 may have a cone shape, a triangular pyramid shape, a polygonal pyramid shape, a cylindrical shape, a triangular cylindrical shape, a quadrangular cylindrical shape, or a polygonal cylindrical shape, which are protruded from the first substrate 140 toward the second substrate 150. In an embodiment of the present invention, the supporting part 792 has a cone shape.

When an area on which the first supporting part 792 having a cone shape and the second substrate 150 contact each other is substantially small, an excessive pressure applied to the first supporting part 792 may cause damage to the first supporting part 792 and/or the second substrate 150. Thus, an end portion of the first supporting part 792 may be rounded.

The second supporting part 794 is formed on the second substrate 150. The second supporting part 794, for example, has a cone shape, a triangular pyramid shape, or a polygonal pyramid shape. In an embodiment of the present invention, the second supporting part 794 has a cone shape. When second supporting part 794 having a cone shape is formed on the second substrate 150, total areas of the electrodes 210 disposed on the first substrate 140 increase. Thus, additional electron-emitting members 410 may be disposed on the electrodes 210. As a result, the luminance of the light generated from the surface light source 850 may be enhanced.

When an area on which the second supporting part 794 having a cone shape and the first substrate 140 contact each other is substantially small, an excessive pressure applied to the second supporting part 794 may cause damage to the second supporting part 794 and/or the first substrate 140. Thus, an end portion of the second supporting part 794 may be rounded.

Figure 11:
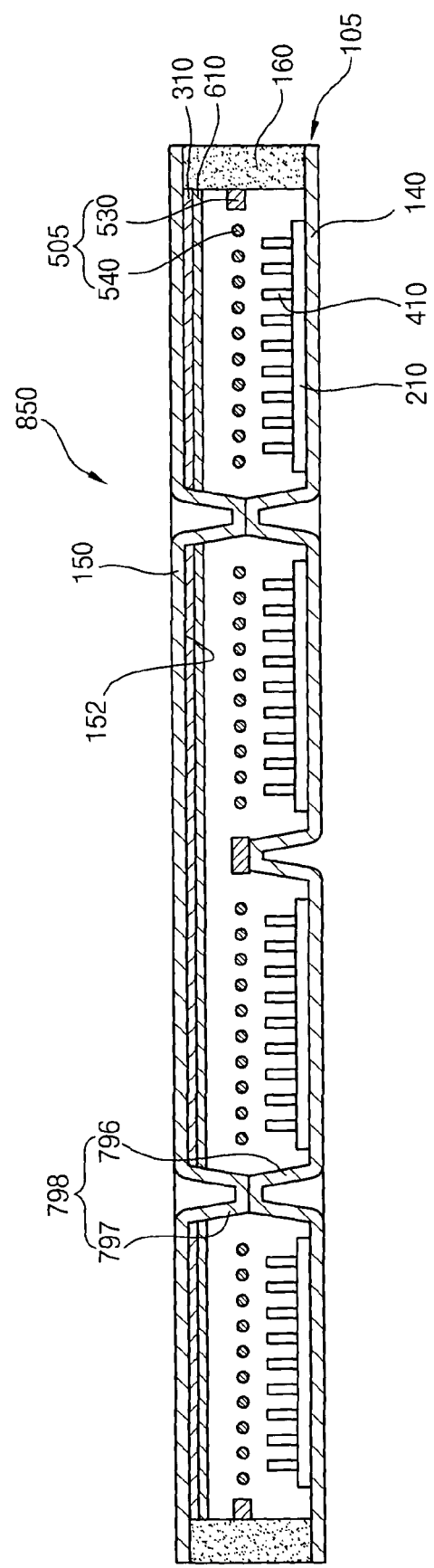
FIG. 11 is a cross-sectional view illustrating a surface light source according to an embodiment of the present invention.

FIG. 11 is a cross-sectional view illustrating a surface light source according to an embodiment of the present invention. The surface light source of FIG. 11 is substantially identical to the surface light source of FIG. 8 except for supporting parts.

Referring to FIG. 11, a supporting part 798 includes a first supporting part 796 and a second supporting part 797. The first supporting part 796 is protruded from the first substrate 140 toward the second substrate 150. The first supporting part 796 protruded from the first substrate 140 has an end portion substantially parallel with the first substrate 140. The first supporting part 796, for example, has a truncated cone shape, a truncated triangular pyramid, or a truncated polygonal pyramid. In an embodiment of the present invention, the first supporting part 796 has a truncated cone shape.

The second supporting part 797 is protruded from the second substrate 150 toward the first substrate 140. The second supporting part 797 protruded from the second substrate 150 has an end portion contacting an end portion of the first supporting part 796. The second supporting part 797, for example, has a truncated cone shape, a truncated triangular pyramid, or a truncated polygonal pyramid. In an embodiment of the present invention, the second supporting part 797 has a truncated cone shape.

Figure 12:
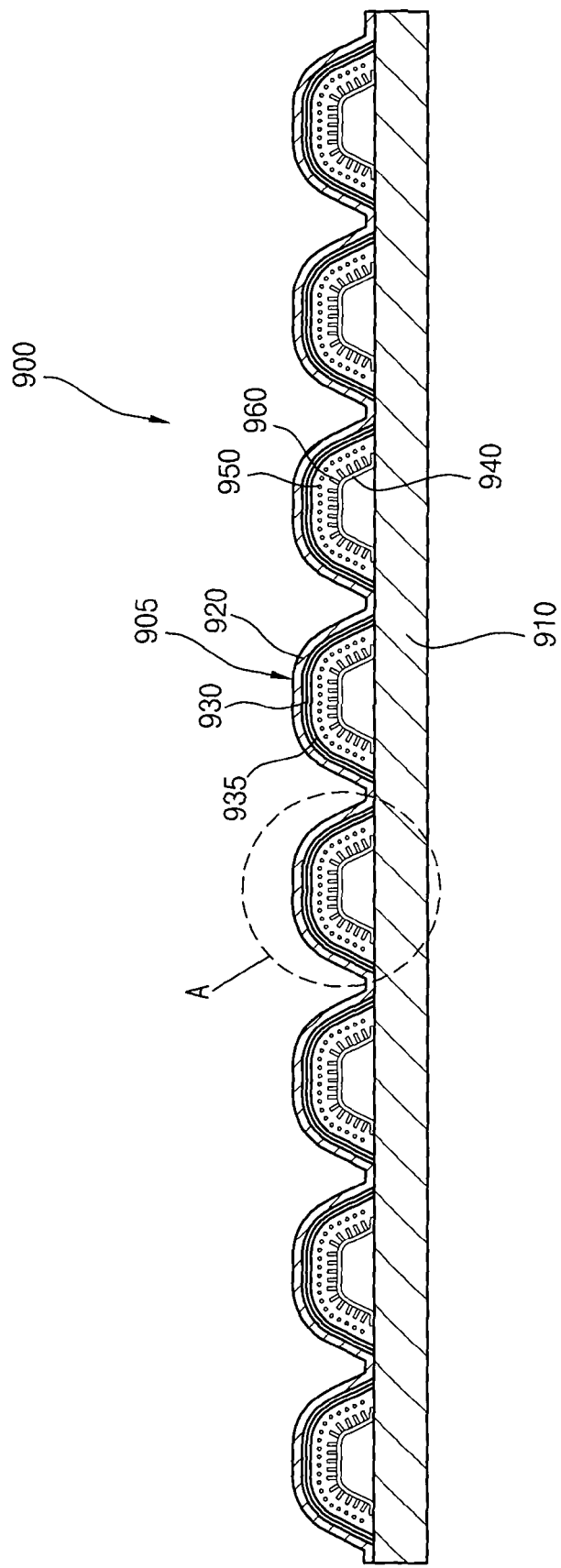
FIG. 12 is a cross-sectional view illustrating a surface light source according to an embodiment of the present invention.
Figure 13:
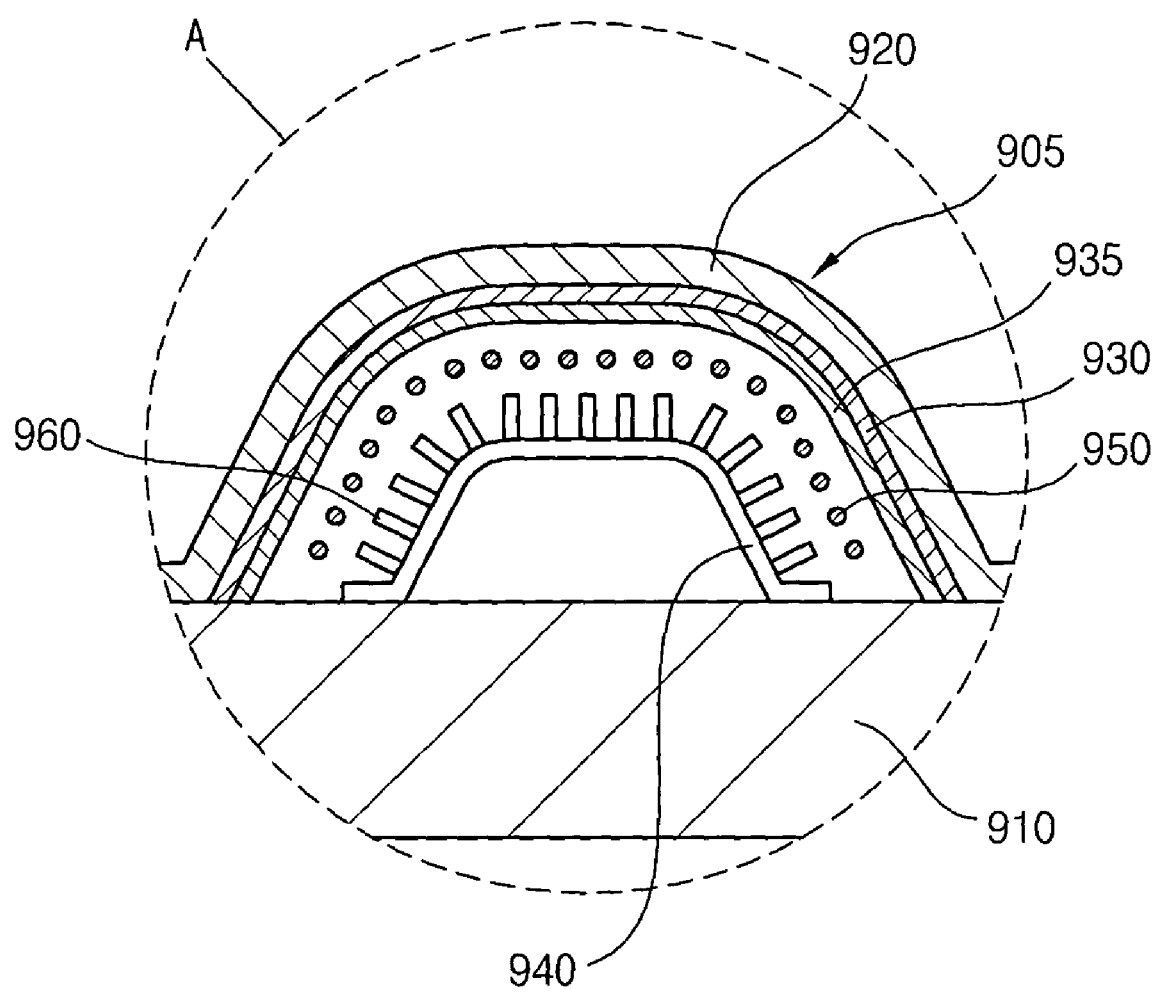
FIG. 13 is an enlarged view of portion 'A' in FIG. 12.

FIG. 12 is a cross-sectional view illustrating a surface light source according to an embodiment of the present invention. FIG. 13 is an enlarged view of portion 'A' in FIG. 12. Referring to FIGS. 12 and 13, a surface light source 900 includes a first substrate 910, a second substrate 920, a transparent electrode 930, an electrode 940, a conductive grid member 950, an electron-emitting member 960 and a fluorescent layer 935.

The first substrate 910, for example, has a plate shape. The first substrate 910 has, for example, a rectangular shape, which can be seen in a plan view. The second substrate 920 includes a plurality of light-emitting parts 905. Each of the light-emitting parts 905, for example, has a semi-cylindrical shape. Alternatively, a cross-section of each light-emitting part 905 may have a trapezoidal shape, a rectangular shape, or a triangular shape.

Each of the light-emitting parts 905 has at least one ridge and grooves adjacent to the ridge. In an embodiment of the present invention, the light-emitting parts 905 are parallelly connected to each other. The grooves of each light-emitting part 905 contact the first substrate 910. An adhesive member may be interposed between the grooves of each light-emitting part 905 and the first substrate 910.

The electrode 940 is disposed on the first substrate 910. The electrode 940 corresponds to the ridge. In an embodiment of the present invention, the electrode 940 has a semi-cylindrical shape, and has substantially the same curvature as that of an inner surface of the light-emitting part 905. The electrode 940, for example, includes a metal. A negative direct current reference voltage may be applied to the electrode 940.

The transparent electrode 930 is disposed on an inner surface of the light-emitting part 905. The transparent electrode 930 faces the electrode 940. The transparent electrode 930, for example, includes a material such as ITO, IZO, or a-ITO. In an embodiment of the present invention, a positive direct current voltage is applied to the transparent electrode 930.

In an embodiment of the present invention, the surface light source 900 includes a plurality of electron-emitting members 960 disposed between the transparent electrode 930 and the electrode 940 and arranged on the electrode 940 in a matrix shape or a radial shape. The electron-emitting members 960, for example, include carbon nanotubes (CNT).

The conductive grid member 950 includes conductive wires arranged in a lattice shape. The conductive grid member 950 has a semi-cylindrical shape, and has a substantially same curvature as that of an inner surface of the light-emitting part 905. A positive direct current voltage may be applied to the conductive grid member 950 to emit electrons from the electron-emitting member 960.

Figure 14:
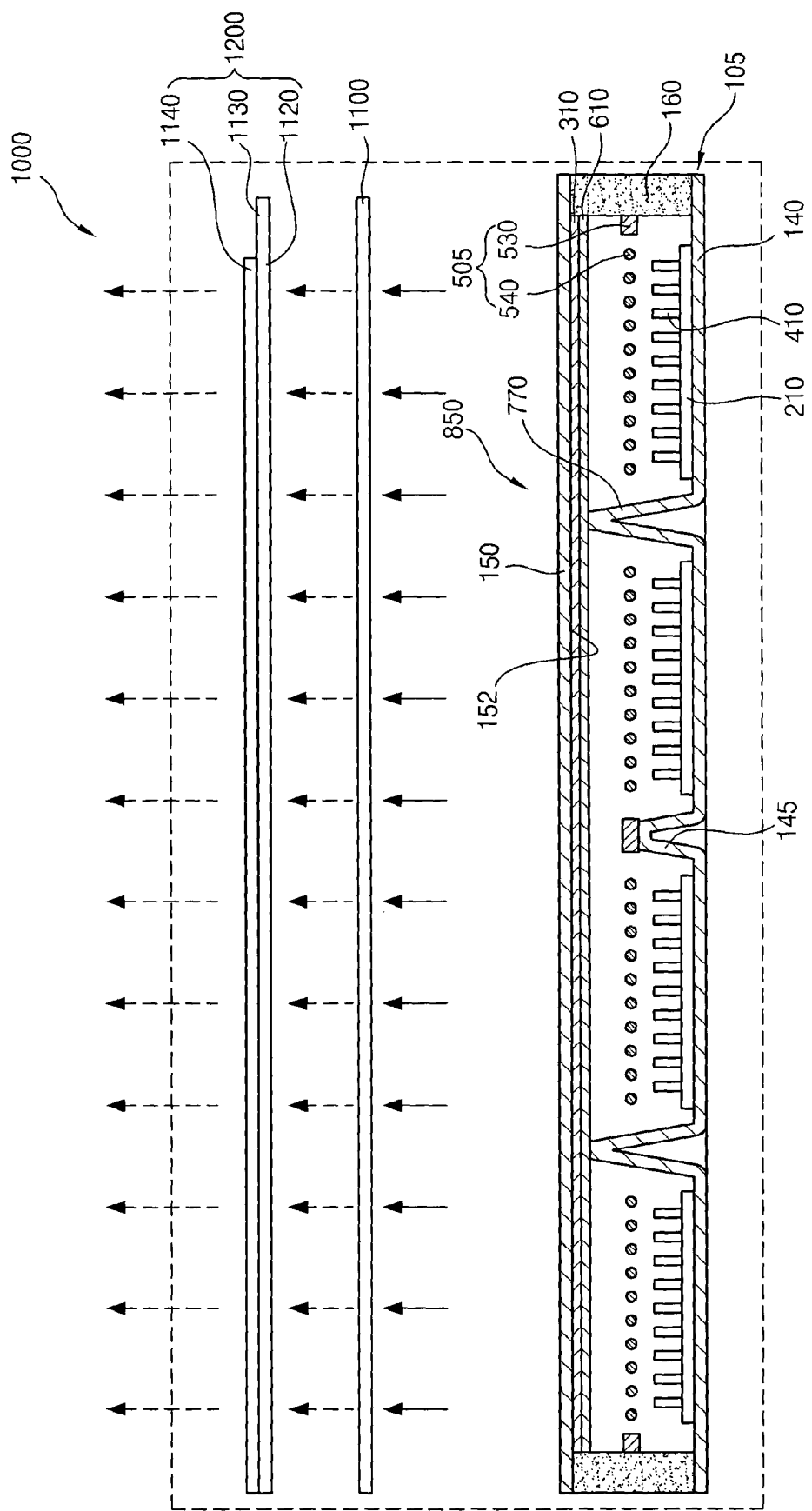
FIG. 14 is a cross-sectional view illustrating a display device according to an embodiment of the present invention.

FIG. 14 is a cross-sectional view illustrating a display device according to an embodiment of the present invention. A surface light source of the display device according to an embodiment of the present invention is substantially identical to the surface light source of FIG. 8.

Referring to FIG. 14, a display device 1000 includes a surface light source 850, an optical member 1100, a display panel 1200 and a receiving container (not shown).

The optical member 1100 is disposed on or over the surface light source 850. The optical member 1100, for example, includes a light-diffusing plate or a light-diffusing sheet.

The display panel 1200 includes a first display panel 1120, a second display panel 1140 and a liquid crystal layer 1130. The first display panel 1120 includes pixel electrodes arranged in a matrix shape to receive pixel voltages applied to the pixel electrodes. The second display panel 1140 faces the first display panel 1120. The second display panel 1140 includes a common electrode facing the pixel electrodes to receive a common voltage applied to the common electrode. Electric fields are generated between each pixel electrode and the common electrode to rearrange molecules of the liquid crystal layer 1130, to thereby display an image using light provided from the surface light source 850.

According to an embodiment of the present invention, the surface light source has a modified structure, thereby simplifying a manufacturing process of the surface light source and enhancing a luminance of light generated from the surface light source.

Although preferred embodiments have been described herein with reference to the accompanying drawings, it is to be understood that the present invention should not be limited to these precise embodiments but various changes and modifications can be made by one of ordinary skill in the art within the spirit and scope of the present invention. All such changes and modifications are intended to be included within the scope of the invention as defined by the appended claims.

What is claimed is:

1. A surface light source comprising:
    a body including a first body part and a second body part, wherein the second body part faces the first body part and wherein the first and second body parts are substrates comprising transparent material;
    an electrode disposed on the first body part;
    a transparent electrode disposed on the second body part;
    an electron-emitting member disposed on the electrode to emit an electron toward the transparent electrode;
    a conductive grid member disposed between the electrode and the transparent electrode to accelerate the electron emitted from the electron-emitting member;
    a fluorescent layer disposed on the transparent electrode to convert the electron into visible light; and
    first and second supporting parts integrally formed with the body to support the first body part and the second body part, wherein the first and second supporting parts, the first body part, and the second body part comprise the same transparent material, and wherein the first and second supporting parts are separated from each other inside the body.

2. The surface light source of claim 1, wherein each of the first and second supporting parts is protruded from the first body part toward the second body part.

3. The surface light source of claim 1, wherein each of the first and second supporting parts has a cone shape.

4. The surface light source of claim 1, wherein the electrode is arranged on the first body part in a matrix shape.

5. The surface light source of claim 1, wherein the electron-emitting member includes a plurality of carbon nanotubes arranged on the electrode in a matrix shape.

6. The surface light source of claim 1, wherein the conductive grid member includes conductive wires arranged in a lattice shape.

7. The surface light source of claim 6, further comprising a fixing protrusion protruded from the first body part to fix the conductive grid member to the body.

8. A surface light source comprising:
    a body including a first body part and a second body part, wherein the second body part faces the first body part;
    an electrode disposed on the first body part;
    a transparent electrode disposed on the second body part;
    an electron-emitting member disposed on the electrode to emit an electron toward the transparent electrode;
    a conductive grid member disposed between the electrode and the transparent electrode to accelerate the electron emitted from the electron-emitting member, wherein the conductive grid member overlaps the electron-emitting member;
    a fluorescent layer disposed on the transparent electrode to convert the electron into visible light; and
    a supporting part integrally formed with the body to support the first body part and the second body part, wherein the supporting part has an empty space therein.

* * * * *